United States Patent [19]
Rockwood

[11] Patent Number: 5,823,539
[45] Date of Patent: Oct. 20, 1998

[54] ENVIRONMENTALLY SAFE PUMP HAVING A BELLOWS SEAL AND A SPLIT RING SHAFT SEAL

[75] Inventor: Robert E. Rockwood, Windham, N.H.

[73] Assignee: Environamics Corporation, Hudson, N.H.

[21] Appl. No.: 426,780

[22] Filed: Apr. 21, 1995

[51] Int. Cl.$^6$ ............................. F16J 15/34; F01D 11/00
[52] U.S. Cl. ........................ 277/85; 277/88; 277/117; 415/110; 415/170.1
[58] Field of Search .................. 277/84, 85, 88, 277/105, 117, 119, 116.2, 120, 144; 415/110, 170.1

[56] References Cited

U.S. PATENT DOCUMENTS

| | | | |
|---|---|---|---|
| 1,263,769 | 4/1918 | Hoke | 277/119 |
| 2,005,429 | 6/1935 | Lichtenstein . | |
| 2,237,494 | 4/1941 | McCormack | 277/88 |
| 2,903,970 | 9/1959 | Elovitz et al. . | |
| 2,984,505 | 5/1961 | Andresen et al. . | |
| 3,091,469 | 5/1963 | Matt | 277/1 |
| 3,115,097 | 12/1963 | Zagar et al. . | |
| 3,122,375 | 2/1964 | Greenwald | 277/88 |
| 3,152,808 | 10/1964 | Tankus et al. | 277/84 |
| 3,515,497 | 6/1970 | Studebaker et al. | 415/112 |
| 4,439,096 | 3/1984 | Rockwood et al. | 415/131 |
| 4,613,141 | 9/1986 | Heinen | 277/27 |
| 4,688,806 | 8/1987 | Heilala | 277/88 |
| 4,900,039 | 2/1990 | Klecker et al. | 277/27 |
| 4,973,065 | 11/1990 | Habich | 277/85 |
| 5,011,166 | 4/1991 | Watts | 277/88 |
| 5,261,676 | 11/1993 | Rockwood | 277/42 |
| 5,292,137 | 3/1994 | Simmons et al. | 277/85 |
| 5,340,273 | 8/1994 | Rockwood | 415/113 |

FOREIGN PATENT DOCUMENTS 2822499  11/1978  Germany .

*Primary Examiner*—Daniel G. DePumpo
*Attorney, Agent, or Firm*—Myers, Liniak & Berenato

[57] ABSTRACT

A seal arrangement for a centrifugal pump including a split ring shaft seal located inboard of both the shaft sleeve and a cartridge-loaded bellows seal so as to prevent the fluid being pumped from leaking under the sleeve and carbonizing. Because there is no carbonization under the sleeve, the bellows seal does not become bonded to the pump shaft. Accordingly, seal disassembly is made easier. A plurality of elongated push rods are disposed along the shaft between the split ring seal and a pushing assembly. The pushing assembly forces the push rods toward the split ring seal so as to tighten it down into fluid sealing contact with the outer periphery of the shaft.

19 Claims, 3 Drawing Sheets

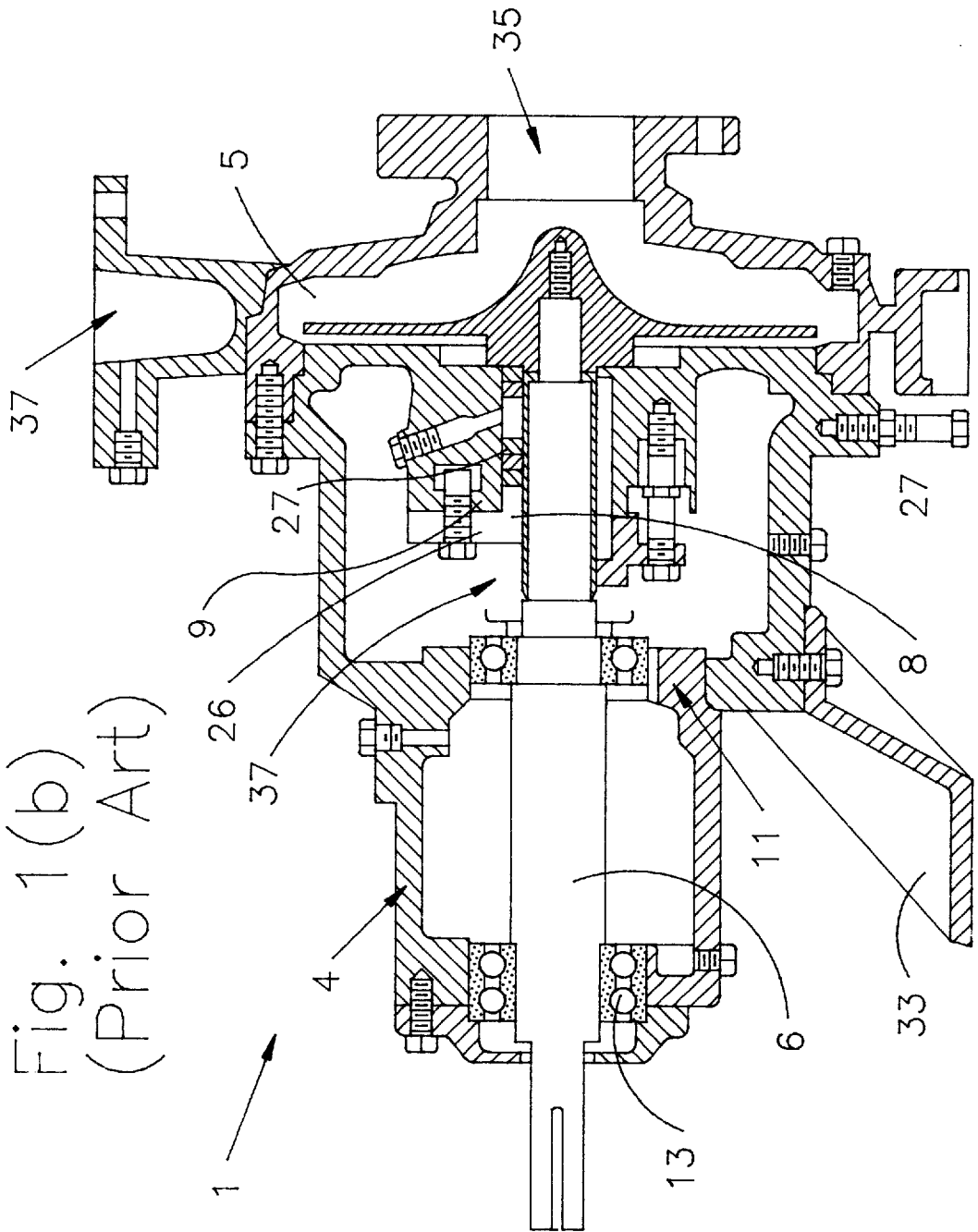

To Impeller ←          → To Pump Bearings and Motor

५,८२३,५३९

ENVIRONMENTALLY SAFE PUMP HAVING A BELLOWS SEAL AND A SPLIT RING SHAFT SEAL

This invention relates to a seal arrangement for a pump. More particularly, this invention relates to a seal arrangement adapted to be used with a centrifugal pump, the seal arrangement including a split ring shaft seal disposed axially along the pump shaft inboard of the sleeve and between the pump impeller and a cartridge-loaded bellows seal.

BACKGROUND OF THE INVENTION

Environmentally hazardous fluids such as acids, oils, and toxins which can cause serious harm to the environment often need to be pumped through fluid flow systems from one location to another. When pumping such dangerous fluid materials, it is important that neither the liquid nor the gases which are often released by the liquid being pumped escape into the surrounding atmosphere or pump areas outside of the desired fluid pumping path.

FIG. 1(a) is a cross-sectional side elevational view of a typical prior art centrifugal chemical processing pump 1. Pump 1 includes casing 3, fluid pumping impeller 5, rotating pump shaft 6, annular stationary member 9 located in the pump seal chamber, inboard shaft supporting ball bearings 11, outboard shaft supporting ball bearings 13, annular seal gland 15, pump frame 17, outboard bearing locknut 19, annular outboard bearing cover 21, pump shaft key coupling 23, seal 25, seal 27, seal 29, adapter 31, and mounting member 33. Pump 1 also includes a motor (not shown) affixed to shaft 6 by way of key coupling 23. The motor functions to drive rotatable shaft 6 thereby rotating impeller 5 so as to pump fluid between inlet 35 and outlet 37 thereby defining a centrifugal pump. Pump 1 of FIG. 1(a) is shown in an inverted position for viewing purposes.

FIG. 1(b) is a side elevational view of another prior art centrifugal chemical processing pump, this figure illustrating a partial section of the pump when cut in half. This pump includes impeller 5 for pumping fluid between fluid inlet 35 and fluid outlet 37. Also disclosed are inboard shaft supporting bearings 11, outboard pump shaft supporting bearings 13, heavy duty rotatable pump shaft 6 connected to impeller 5, interchangeable bearing cartridge 4, stainless steel shaft sleeve 8 surrounding pump shaft 6, packing or mechanical seal 27 located in pump seal area 26, two piece packing gland 26, and support 33. This particular drawing is a typical section of a prior art Worthington D line centrifugal pump.

It is known to utilize bellows seals in chemical processing pumps. In the prior art, when bellows seals were used in such pumps, they were sometimes used in conjunction with a separate shaft seal with the shaft seal being positioned rearwardly (outboard) of the bellows seal so as to be located under the lock ring area in between the bellows seal and the pump motor. Unfortunately, the problem with this is that when high temperature fluid is being pumped (e.g. hot oil), it tends to seep under the sleeve and carbonize under the entire length of the seal thereby bonding the seal to the pump shaft. This makes disassembly extremely difficult. In other words, as a result of the pumped fluid leaking under sleeve 8 before it reaches the bellows seal, carbon may be formed under the seal and sleeve which results in bonding them to the pump and complicating seal disassembly.

It is apparent from the above that there exists a need in the art for a seal arrangement which will eliminate the aforesaid problems and simplify seal disassembly. Preferably, such a seal arrangement would include a bellows seal and a shaft seal with the shaft seal being located inboard of the sleeve and bellows seal so as to be disposed along the shaft axially between the bellows seal and the impeller end of the pump. This would prevent any leakage or carbon forming under the sleeve and therefore simplify seal disassembly.

It is the purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a fluid seal arrangement for a device having a rotatable shaft, the seal arrangement comprising:

an annular seal assembly adapted to be disposed around the shaft, the seal assembly including a stationary annular sealing member and a rotating annular sealing member, the rotating annular sealing member adapted to be affixed to the shaft for rotation therewith so as to define a fluid sealing interface between the abutting surfaces of the rotating and stationary sealing members;

a tubular sleeve adapted to surround the shaft;

a split ring shaft seal located inboard of both the sleeve and the annular seal assembly for preventing the fluid being sealed from leaking under the sleeve; and push means located at least partially outboard of the annular seal assembly, the push means for causing the split ring shaft seal to be tightened.

This invention further fulfills the above-described needs in the art by providing a centrifugal pump comprising:

a rotatable shaft;

a fluid pumping impeller connected to the shaft for rotation therewith, the impeller for pumping fluid from an inlet to an outlet defined in the pump;

a seal arrangement disposed axially along the shaft rearward of the impeller, the seal arrangement comprising:

a) a tubular sleeve disposed around the shaft for rotation therewith;

b) a split ring shaft seal disposed inboard of the sleeve for preventing pumped fluid from making its way under the sleeve;

c) a plurality of elongated push members connected to the split ring seal and extending axially rearward along the shaft therefrom, the elongated push members affixed to the shaft for rotation therewith;

d) push means for pressuring or biasing the elongated push members so as to tighten the split ring shaft seal; and e) an annular seal having a stationary sealing member and a rotating sealing member surrounding the shaft, the annular seal being located axially between the split ring seal and the push means.

This invention further fulfills the above-described needs in the art by providing a seal arrangement adapted to be used in a centrifugal pump having a rotatable shaft, the seal arrangement comprising:

a bellows seal assembly adapted to be positioned circumferentially around the rotatable shaft, the bellows seal assembly for sealing the fluid being pumped and including an annular bellows for biasing a stationary annular sealing member into sealing contact with a rotatable annular sealing member so as to define a fluid seal therebetween, the rotatable annular sealing member adapted to rotate with the rotatable shaft;

a shaft seal located inboard of the bellows seal assembly such that the shaft seal is adapted to be positioned axially along the rotatable shaft between the bellows seal assembly and the impeller end of pump, the shaft seal including a split ring having first and second mating annular members arranged so that the first mating annular member is adapted to be pressured by the second mating annular member into fluid sealing contact with the shaft;

a plurality of elongated push rods adapted to be disposed axially along the rotatable shaft, the elongated push rods for pressuring the second mating annular members so that it forces the first mating annular member of the split ring radially inward into sealing contact with the shaft; and wherein force is placed on the plurality of elongated push rods by a pressing assembly thereby causing the push rods to pressure the second mating member, and wherein the bellows seal assembly is adapted to be disposed along the shaft axially between at least a portion of the pressing assembly and the split ring.

IN THE DRAWINGS

FIG. 1(b) is a partial side elevational view of the interior of another prior art chemical processing centrifugal pump cut in half.

DETAILED DESCRIPTION OF CERTAIN EMBODIMENTS OF THIS INVENTION

Figure 1A:
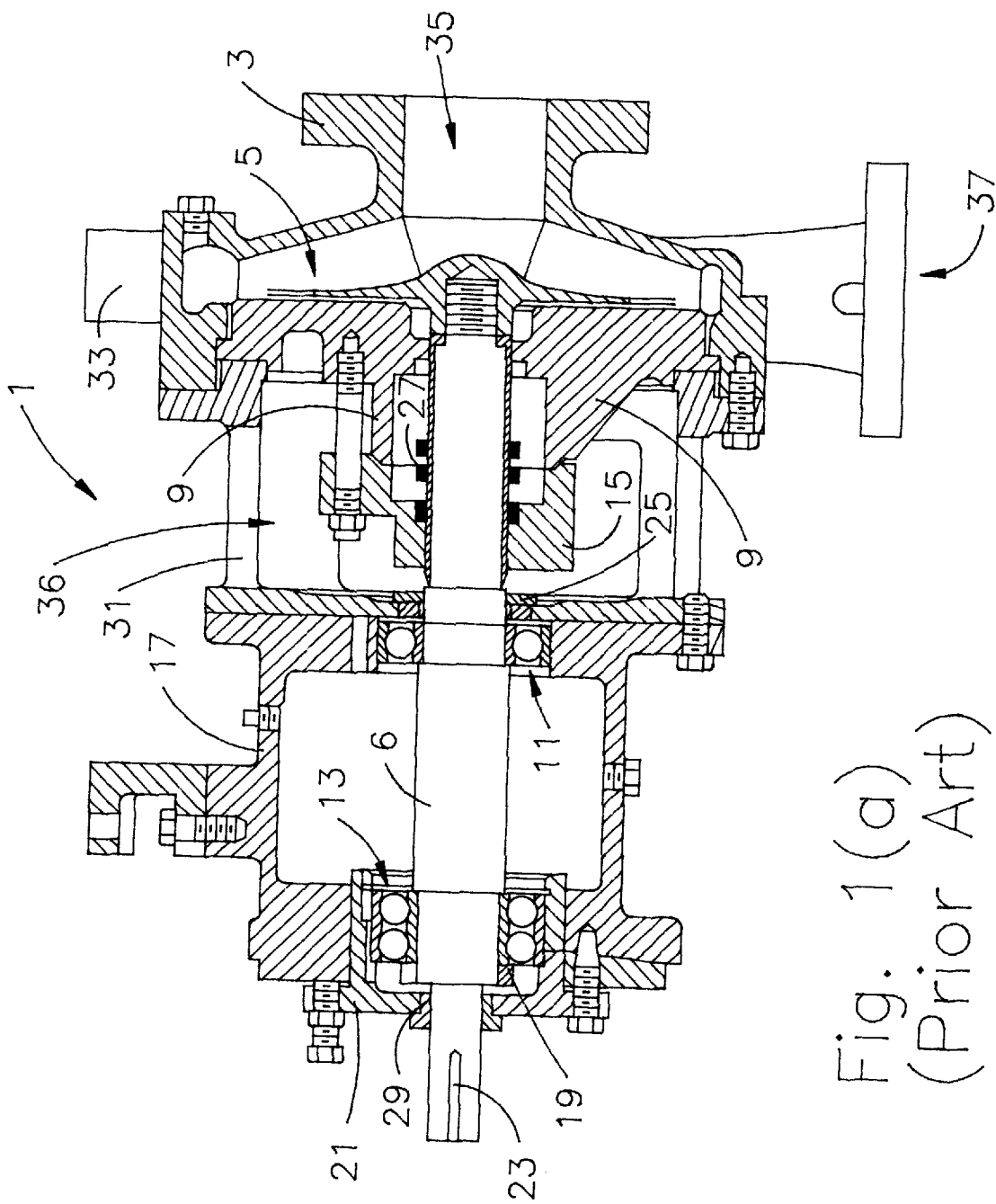
FIG. 1(a) is a partial side elevational cross-sectional view of a prior art chemical processing centrifugal pump.

Referring now more particularly to the accompanying drawings in which like reference numerals indicate like parts throughout the several views.

Figure 2:
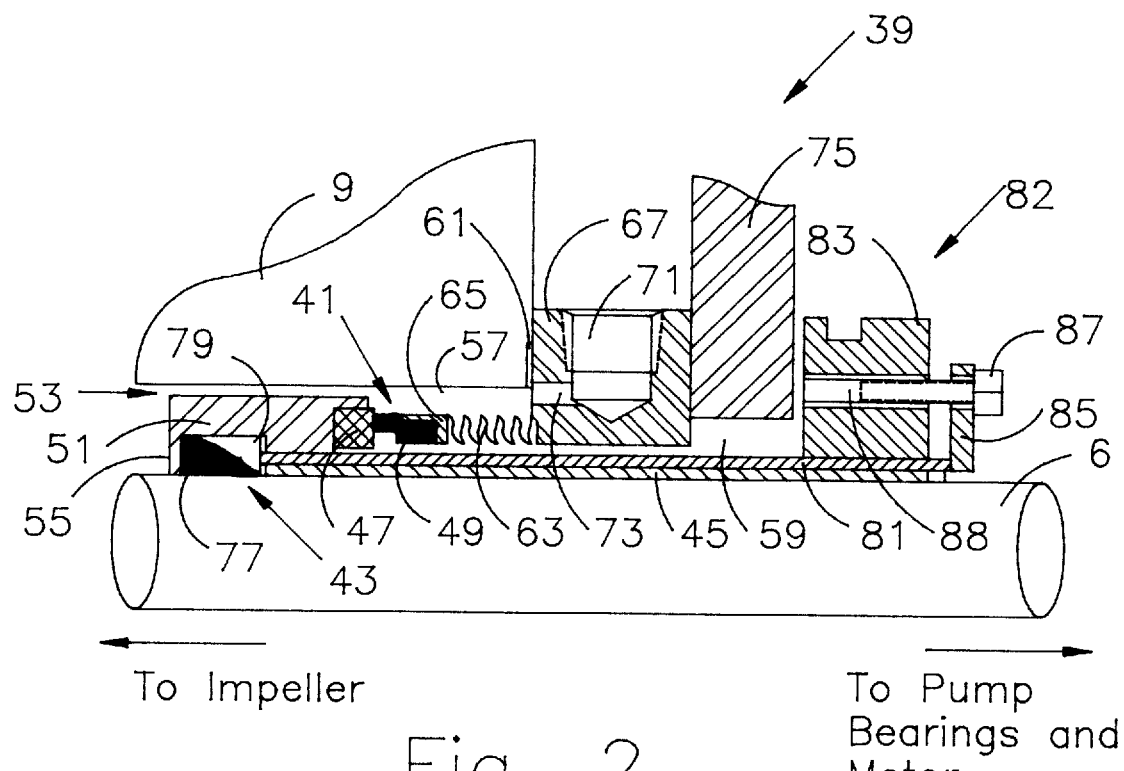
FIG. 2 is a partial cross-sectional side elevational view of a seal arrangement according to an embodiment of this invention, the seal arrangement being illustrated cross-sectionally and the shaft being shown in a side elevational manner.

FIG. 2 is a side elevational partial cross-sectional view of seal arrangement 39 according to an embodiment of this invention, seal arrangement 39 adapted to be positioned within a chemical processing centrifugal pump such as, for example, the ones illustrated in prior art FIGS. 1(a) and 1(b). The seal arrangements of the various embodiments of this invention are adapted to replace seals 27 in prior art pumps 1. The seal arrangement of FIG. 2 is also adapted to fit into, for example, centrifugal pumps of the Goulds 3196 ANSI pump line; Durion ANSI centrifugal Mark II and Mark III model pumps; and Worthington D-Line ANSI centrifugal pumps. Seal arrangement 39 may also be utilized within non-ANSI centrifugal pumps in accordance with the particular application desired. The above-listed exemplary ANSI and non-ANSI pump lines each include a plurality of different sized pumps. Accordingly, the seal arrangements of the different embodiments of this invention may vary in size depending upon at least the pump shaft diameter of the centrifugal pump into which the seal arrangement is to be placed. Alternatively, seal arrangement 39 may be utilized in other conventional rotating equipment or devices having rotating shafts, such equipment including but not limited to mixers, agitators, and compressors.

It will be understood by those of ordinary skill in the art that FIG. 2 illustrates only the top half of seal arrangement 39 which surrounds pump shaft 6 and that the lower half of the annular seal arrangement is not illustrated in this figure for purposes of simplicity.

Environmentally safe seal arrangement 39 is annular in nature so as to surround rotatable pump shaft 6 and includes annular cartridge-loaded bellows seal assembly 41 and split ring shaft seal assembly 43. Split ring seal assembly 43 is located inboard (axially toward the impeller) of bellows assembly 41 and sleeve 45 so as to prevent leakage or carbon forming under tubular sleeve 45. By eliminating leakage and carbon formation under sleeve 45, the chance of sleeve 45 and seal assembly 41 bonding to pump shaft 6 is significantly reduced thereby simplifying disassembly procedures.

Bellows seal assembly 41 includes annular rotating sealing member 47 and annular stationary sealing member 49. Rotating sealing member 47 surrounds pump shaft 6 and is affixed to annular member 51 which is in turn affixed to shaft 6 for rotation therewith. Thus, when pump shaft 6 is driven by the pump motor, member 51 and sealing member 47 rotate along with the shaft thereby creating a fluid sealing interface between the abutting sealing surfaces of members 47 and 49.

Bellows seal assembly 41 seals the fluid being pumped and prevents it from leaking axially rearward along shaft 6 toward the motor area of the pump and into the surrounding atmosphere. Typically, some of the fluid being pumped inevitably makes its way rearward along shaft 6 as illustrated by arrows 53 until it reaches forward radially extending face 55 of annular rotating member 51. When the fluid being pumped reaches face 55, it proceeds radially outward and makes its way into annular passageway 57. Annular passageway 57 is located radially between stationary annular member 9 and the exterior radial peripheries of member 51 and bellows seal assembly 41. After the fluid being pumped makes its way into annular passageway or chamber 57, it is prevented from further leakage into annular cavity area 59 by seal assembly 41 and gasket 61.

Rotating sealing member 47 may be made of, for example, silicon carbide while stationary sealing member 49 may be made of, for example, carbon or simply have a carbon sealing face. An exemplary carbon of which member 49 may be made is grade 658RC available from Pure Carbon Company, St. Marys, Pa., such premium grade(s) being commercially known in the art. Other conventional materials may alternatively be used.

During rotation of pump shaft 6, stationary annular sealing member 49 is urged or biased into sealing interface with annular member 47 by metal accordion-like annular bellows 63. Bellows 63 may be made of, for example, AM350 stainless steel or any other suitable material. Bellows 63 is annular so as to circumferentially surround shaft 6 thereby creating a seal between passageway 57 and area 59 so as to prevent the fluid being pumped present in passageway 57 from making its way into area 59.

The accordion-like design of metal bellows 63 biases stationary sealing member 49 into fluid sealing contact with member 47. Bellows 63 may be welded to metal pieces on both ends such as L-shaped member 65 and annular bellows support member 67. In other words, the axially rearward end of metal bellows 63 may be welded to stationary annular support member 67 while the axially forward end of bellows 63 is welded to L-shaped member 65. L-shaped member 65 is affixed to stationary sealing member 49 and is provided so as to allow the bellows to be affixed to member 49 and urge it into fluid sealing interface with member 47.

Annular seal or gasket 61 is disposed between the radially extending surface of member 9 and the axially forward radially extending surface of bellows support 67. Seal 61 prevents fluid present in passageway 57 from leaking therebeyond adjacent support 67. Seal or gasket 61 may be made, for example, conventional rubber or fiber materials such as Garlock fiber grade 3700.

Annular support member 67 includes radially extending pipe tap aperture 71 defined therein which is in fluid communication with axially extending flush hole 73. Pipe tap 71 and flush hole 73 are provided so that the pump operator may selectively force a cleaning solution such as water into elongated annular passageway 57 for the purpose of dislodging dirt or corrosive materials from bellows 63 and seal assembly 41. Accordingly, pipe tap 71 is closed or plugged during normal operating conditions of the pump and is opened during flushing.

Support member 67 is positioned adjacent annular stationary seal gland 75. Members 67 and 75 may or may not be integrally formed with one another, however, both are preferably formed of conventional metal materials (e.g. stainless steel) according to certain embodiments of this invention. Annular gland 75 allows seal assembly 39 to be affixed or bolted to the seal chamber of the centrifugal pump. Gland 75 includes axial holes (not shown) which permit assembly 39 to be bolted or otherwise affixed to the pump seal chamber.

Split ring shaft seal or gasket assembly 43 is located axially forward (inboard) of bellows seal assembly 41 so as to be positioned between the pump impeller and assembly 41 thereby preventing the fluid being pumped from leaking under tubular sleeve 45 and thereafter causing bonding of assembly 41 to the pump shaft and making pump or seal disassembly very difficult. Shaft seal 43 includes a split ring member made up of annular wedge-shaped sealing member 77 and a corresponding mating wedge-shaped annular member 79. Annular members 77 and 79 make up the split ring and are arranged so that when axially forward directed pressure is placed upon member 79, it in turn forces wedge-shaped sealing member 77 radially inward into a sealing interface with shaft 6 thereby tightening the seal. Because members 77 and 79 are positioned within a split ring housing or groove defined in annular member 51, the split ring assembly is prevented from moving as a whole axially forward toward the pump impeller. Members 77 and 79 are arranged so as to rotate with pump shaft 6.

A plurality (e.g. four) of elongated axially extending push rods 81 are arranged along shaft 6 radially exterior sleeve 45 for the purpose of allowing axially forward directed pressure to be placed upon the rear side of split ring member 79. When such axially forward pressure is placed upon member 79, this causes member 79 to in turn force mating member 77 into sealing contact with shaft 6 thereby preventing the fluid being pumped from leaking rearward along the shaft and making its way adjacent and under sleeve 45. The plurality of elongated metal push rods 81 are affixed to annular lock ring 83 by way of an annular push ring 85 and a plurality of circumferentially spaced pusher bolts 87 or other suitable fasteners. Lock ring 83 along with push ring 85 and push rods 81 are affixed to pump shaft 6 for rotation therewith.

Figure 3:
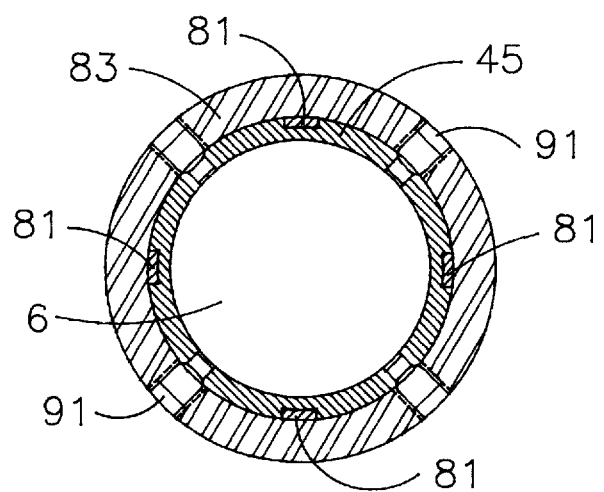
FIG. 3 is a front or rear cross-sectional view of the lock ring, sleeve, and push rods of the FIG. 2 embodiment.

FIG. 3 is a front or rear cross-sectional view of the pressing assembly 82 made up of members 81, 83, 85, and 87, this cross-sectional view taken within lock ring 83. As shown, the plurality of elongated push rods 81 are circumferentially spaced around shaft 6 at substantially equal intervals and are disposed in grooves defined in the exterior radial periphery of sleeve 45. Set screws 91 are provided for affixing lock ring 83 and the other members making up pressing assembly 82 to shaft 6 so as to rotate therewith.

Push ring 85 is a solid annular member with bolt apertures defined therein. Ring 85 is connected to rods 81. Pusher bolts 87 are adapted to exert an axially forward pressure on ring 85 when tightened into holes 88. This in turn causes the plurality of push rods 81 to be forced axially forward toward and into pressing contact with wedge-like member 79 of the split ring seal. When bolts 87 create an axially forward directed pressure on push rods 81 via ring 85, the rods in turn force wedge-like member 79 axially forward which, due to the wedge-like arrangement between mating split ring members 77 and 79, forces sealing member 77 radially inward thus creating a sealing interface at the exterior periphery of shaft 6. Thus, inboard split ring seal or gasket 43 can be tightened to create a better seal simply by tightening any or all of push bolts 87.

Split ring sealing member 77 may be made of carbon graphite or Grafoil in order to withstand high temperatures. However, those of ordinary skill in the art will realize that any other conventional material may be used in accordance with the particular application contemplated. Wedge-like split ring pushing member 79 is preferably made of a metal material according to certain embodiments of this invention, but other suitable materials will suffice.

During a typical operation of seal assembly 39, the fluid being pumped is sealed as follows. When the fluid being pumped makes its way axially rearward along shaft 6 as illustrated at 53, it comes into contact with face 55 of rotating member 51. At this point, split ring shaft seal assembly 43 prevents the fluid being pumped from leaking under rotating member 51 and rotating sleeve 45. Therefore, the fluid being pumped makes its way radially outward and then axially rearward into passageway 57. When in passageway 57, the fluid being pumped is prevented from making its way into area 59 by bellows seal assembly 41 as set forth above. Additionally, annular seal or gasket 61 prevents the fluid being pumped from making its way toward the atmosphere adjacent stationary member 67. In sum, seal arrangement 39 is an improved design which effectively seals the pumped fluid and gives rise to ease of seal disassembly because the sometimes hazardous and/or corrosive high temperature fluid being pumped is prevented from making its way under sleeve 45. Thus, bellows seal assembly 41 does not become bonded to shaft 6 and removal or disassembly of arrangement 39 from the pump is made simpler.

Unless discussed above, the above-described elements of the various embodiments of this invention are manufactured and connected to one another by conventional methods and materials commonly used throughout the art.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A seal arrangement adapted to be used in a centrifugal pump having a rotatable shaft, the seal arrangement comprising:

a bellows seal assembly adapted to be positioned circumferentially around the rotatable shaft, said bellows seal assembly for sealing the fluid being pumped and including an annular bellows for biasing a stationary annular sealing member into sealing contact with a rotatable annular sealing member so as to define a fluid seal therebetween, said rotatable annular sealing member adapted to rotate with the rotatable shaft;

a shaft seal located inboard of said bellows seal assembly such that said shaft seal is adapted to be positioned axially along the rotatable shaft between said bellows seal assembly and the inboard end of the pump, said shaft seal including a split ring having first and second mating annular members arranged so that the first mating annular member is adapted to be pressured by said second mating annular member into fluid sealing contact with the shaft;

a plurality of elongated push rods adapted to be disposed axially along the rotatable shaft, said elongated push rods for pressuring said second mating annular member so that it forces said first mating annular member radially inward into sealing contact with the shaft; and wherein force is placed on said plurality of elongated push rods by a pressing assembly thereby causing said push rods to pressure said second mating member, and wherein said bellows seal assembly is adapted to be disposed along the shaft axially between at least a portion of said pressing assembly and said split ring.

2. The seal arrangement of claim 1, wherein said pressing assembly includes an annular lock ring adapted to be affixed to the shaft for rotation therewith, and an annular push ring affixed to said lock ring by way of a plurality of pusher members so that when said pusher members are tightened the push ring and said elongated push rods are forced axially forward into said second mating annular member so that said first mating annular member is pressed radially inward into sealing interface with the shaft.

3. The seal arrangement of claim 2, further comprising a tubular elongated sleeve adapted to be disposed around the shaft for rotation therewith, said sleeve adapted to be disposed radially between the shaft and said push rods, said shaft seal being located inboard of said sleeve so as to prevent pumped fluid from leaking thereunder.

4. The seal arrangement of claim 3, wherein said push rods are adapted to be disposed along the shaft and are located radially between said sleeve and said bellows seal assembly so as to define an annular cavity radially between the radially inner periphery of said bellows and the radially outer periphery of said push rods.

5. The seal arrangement of claim 4, wherein said push rods are located in elongated grooves or notches defined in the radially outer periphery of said sleeve.

6. The seal arrangement of claim 5, further comprising a stationary annular bellows support member disposed radially outward of and surrounding said sleeve, the axially rear end of said bellows being affixed to said bellows support member and the axially forward end of said bellows being affixed to said stationary annular sealing member.

7. The seal arrangement of claim 6, wherein said bellows support member has a flush hole defined therein for allowing a user to inject liquid into said seal arrangement adjacent said bellows so as to clean said bellows.

8. The seal arrangement of claim 7, further comprising a stationary annular gland for allowing the seal arrangement to be affixed to the seal chamber of the pump, said bellows support member being affixed to said gland.

9. The seal arrangement of claim 8, wherein said annular biasing bellows is accordion-like in design and said first and second mating members are made of different materials and are wedge-like in cross-sectional shape.

10. A fluid seal arrangement adapted for use in a device having a rotatable shaft, the seal arrangement comprising:

an annular seal assembly adapted to be disposed around the shaft, said seal assembly including a stationary annular sealing member and a rotating annular sealing member, said rotating annular sealing member adapted to be affixed to the shaft for rotation therewith so as to define a fluid sealing interface between the abutting surfaces of said rotating and stationary sealing members;

a tubular sleeve adapted to surround the shaft;

a split ring shaft seal located inboard of both said sleeve and said annular seal assembly for preventing the fluid being sealed from leaking under said sleeve; and push means located at least partially outboard of said annular seal assembly, said push means for causing said split ring shaft seal to be tightened.

11. The seal arrangement of claim 10, wherein said push means includes a plurality of elongated push rods extending from said split ring shaft seal to a location outboard of said seal assembly.

12. The seal arrangement of claim 11, wherein said push means further includes an annular lock ring disposed outboard of said seal assembly and radially outward of said push rods, said lock ring adapted to be affixed to the shaft for rotation therewith.

13. The seal arrangement of claim 12, wherein said push means further includes a tightening means located outboard of said lock ring.

14. The seal arrangement of claim 13, wherein said tightening means includes a plurality of fasteners for tightening an annular push ring to said lock ring so as to tighten said split ring seal against the shaft.

15. A centrifugal pump comprising:

a rotatable shaft;

a fluid pumping impeller connected to said shaft for rotation therewith, the impeller for pumping fluid from an inlet to an outlet defined in the pump;

a seal arrangement disposed axially along said shaft outboard of said impeller, said seal arrangement comprising:

a) a tubular sleeve disposed around said shaft for rotation therewith;

b) a split ring shaft seal disposed inboard of said sleeve for preventing pumped fluid from making its way under said sleeve;

c) a plurality of elongated push members connected to said split ring seal and extending axially outboard along the shaft therefrom, said elongated push members affixed to said shaft for rotation therewith;

d) push means for pressuring said elongated push members so as to tighten said split ring shaft seal; and e) an annular seal having a stationary sealing member and a rotating sealing member surrounding said shaft, said annular seal being located axially between said split ring seal and said push means.

16. The pump of claim 15, wherein said elongated push members are located in corresponding grooves defined in the radially outer periphery of said sleeve.

17. The pump of claim 15, wherein said annular seal is a bellows seal including a metal accordion-like annular bellows for biasing said stationary sealing member into fluid sealing contact with said rotating sealing member.

18. The pump of claim 15, wherein said push means includes an annular lock ring and a push ring affixed to said shaft for rotation therewith.

19. The pump of claim 18, wherein said push means further includes a plurality of fasteners for tightening said push ring against said lock ring so that said elongated push members are forced toward and into said split ring in order to tighten down said split ring seal.

* * * * *